United States Patent [19]
Fujita

[11] Patent Number: 5,819,290
[45] Date of Patent: Oct. 6, 1998

[54] DATA RECORDING AND MANAGEMENT SYSTEM AND METHOD FOR DETECTING DATA FILE DIVISION BASED ON QUANTITATIVE NUMBER OF BLOCKS

[75] Inventor: Hiroyuki Fujita, Kanagawa, Japan

[73] Assignee: Sony Corporation, Tokyo, Japan

[21] Appl. No.: 629,548

[22] Filed: Apr. 9, 1996

[30]  Foreign Application Priority Data

Apr. 10, 1995  [JP]  Japan ................................... 7-084112

[51] Int. Cl.⁶ ................................................ G06F 17/30
[52] U.S. Cl. .......................... 707/2; 707/101; 707/205; 711/100
[58] Field of Search ................... 707/200, 205, 707/101; 711/100

[56]  References Cited

U.S. PATENT DOCUMENTS

| | | | |
|---|---|---|---|
| 4,536,837 | 8/1985 | Olson | 707/205 |
| 5,274,807 | 12/1993 | Hoshen | 707/205 |
| 5,276,830 | 1/1994 | Endo | 707/205 |
| 5,333,311 | 7/1994 | Whipple, II | 707/205 |
| 5,359,725 | 10/1994 | Garcia | 707/200 |
| 5,398,142 | 3/1995 | Davy | 360/48 |
| 5,422,762 | 6/1995 | Jerbic | 360/48 |
| 5,454,103 | 9/1995 | Coverston | 707/205 |
| 5,479,656 | 12/1995 | Rawlings, III | 707/200 |
| 5,630,111 | 5/1997 | Yoshida | 395/559 |

*Primary Examiner*—Thomas G. Black
*Assistant Examiner*—Diane D. Mizrahi
*Attorney, Agent, or Firm*—Frommer Lawrence & Haug LLP; William S. Frommer

[57]  ABSTRACT

A data recording apparatus including a recording unit for recording a data file as one or a plurality of blocks on a randomly accessible recording medium; a managing unit for managing the recording position of the data file by using management data comprised of the file name of the data file, data indicating the head positions of the blocks, data indicating the sizes of the blocks, and data indicating the links among the blocks; a detecting unit for detecting the degree of division of the data file based on the quantitative number of the blocks indicated by the management data; and a moving unit for moving the blocks so that the data is recorded at a position where blocks of continuous contents of data are recorded continuously as much as possible in accordance with the degree of the division of the data file in response to the detection of the detecting unit. Also, a method of data management.

11 Claims, 9 Drawing Sheets

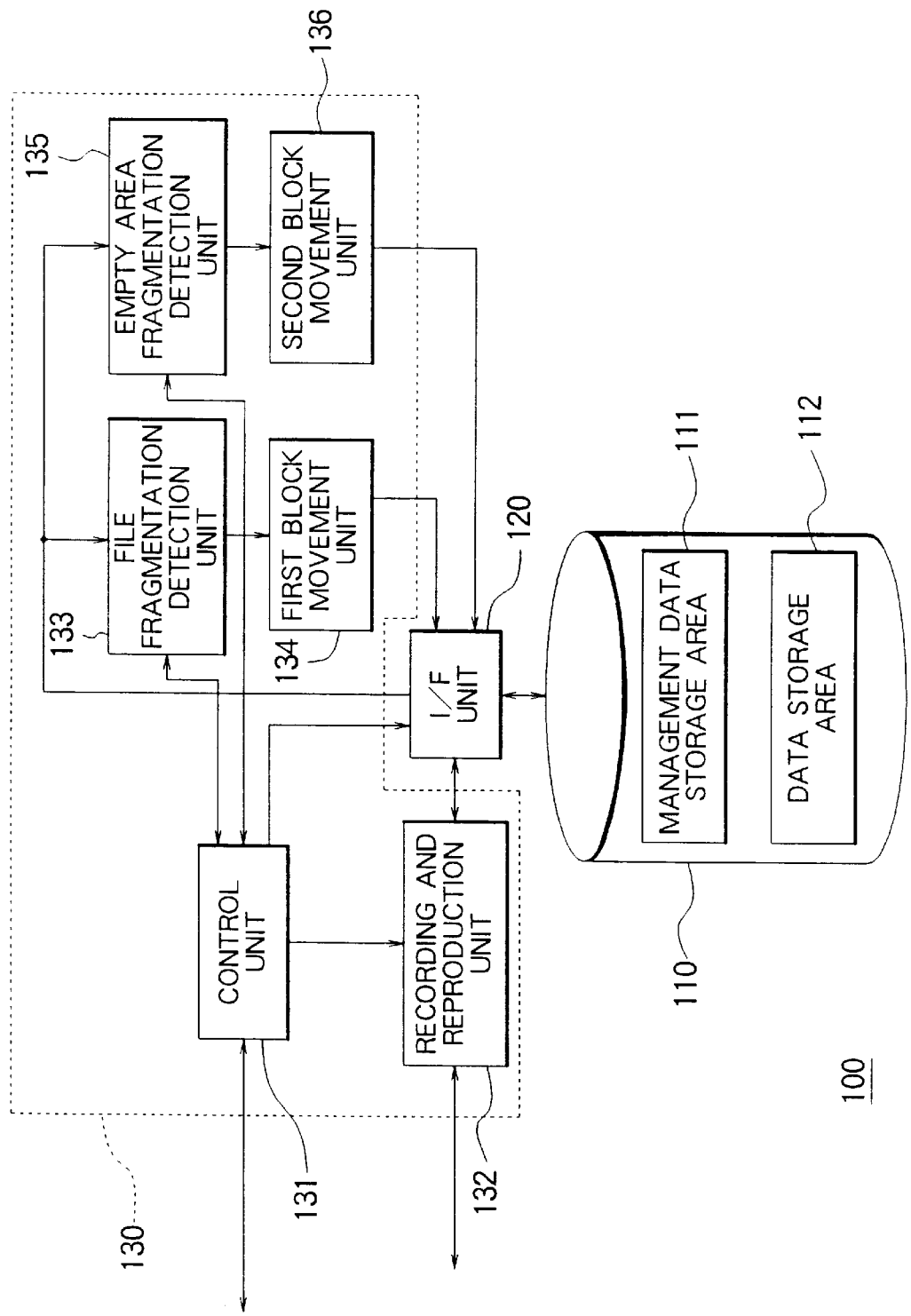

FIG. 6A

| RECORD BLOCK $D_1$ | EMPTY AREA 1 | RECORD BLOCK $A_1$ | EMPTY AREA 2 | RECORD BLOCK $D_2$ | EMPTY AREA 3 | RECORD BLOCK $D_3$ |

FIG. 6B

| RECORD BLOCK $D_1$ | EMPTY AREA 1 | RECORD BLOCK $A_1$ | RECORD BLOCK $D_2$ | EMPTY AREA 2 | RECORD BLOCK $D_3$ | EMPTY AREA 3 |

FIG. 6C

| RECORD BLOCK $D_1$ | RECORD BLOCK $D_2$ | RECORD BLOCK $A_1$ | EMPTY AREA 1 | EMPTY AREA 2 | RECORD BLOCK $D_3$ | EMPTY AREA 3 |

FIG. 6D

| RECORD BLOCK $D_1$ | EMPTY AREA 1 | RECORD BLOCK $A_1$ | EMPTY AREA 2 | RECORD BLOCK $D_2$ | RECORD BLOCK $D_3$ |

FIG. 7A

| RECORD BLOCK B₁ | RECORD BLOCK A₁ | RECORD BLOCK B₂ | EMPTY AREA |

FIG. 7B

| EMPTY AREA | RECORD BLOCK B₁ | EMPTY AREA | RECORD BLOCK A₁ | EMPTY AREA | RECORD BLOCK B₂ | EMPTY AREA |

DATA RECORDING AND MANAGEMENT SYSTEM AND METHOD FOR DETECTING DATA FILE DIVISION BASED ON QUANTITATIVE NUMBER OF BLOCKS

BACKGROUND OF THE INVENTION

1. Field of the Invention

The present invention relates to a data recording apparatus which can efficiently record any data file on a randomly accessible recording medium suitably divided into a plurality of blocks and to a method of management of data thereof.

2. Description of the Related Art

When recording data on a disc medium such as a hard disc or magneto-optic disc (MO disc), the file management, that is, the way the files are recorded on the disc, for example, the method of assignment of files to the recording regions, is important.

In the conventional method of file management, however, it suffers from the disadvantage that it is difficult to firmly grasp the state of fragmentation of the data and fragmentation of the empty areas.

Since the state of the fragmentation of the data and the fragmentation of the empty areas cannot be suitably grasped, it was not possible to reduce the fragmentation of the data and appropriately move the data either so that the empty areas become continuous as much as possible.

SUMMARY OF THE INVENTION

An object of the present invention is to provide a data recording apparatus which suitably grasps the state of the fragmentation of the data recorded on the recording medium and can appropriately reconstructs the fragmented data.

Another object of the present invention is to provide a data recording apparatus which suitably grasps the state of dispersion of the empty areas of the recording medium and can appropriately reconstructs the fragmented empty areas.

Still another object of the present invention is to provide a method of data management which suitably grasps the state of the fragmentation of the data recorded on the recording medium.

Yet another object of the present invention is to provide a method of data management which suitably grasps the state of the dispersion of the empty areas of the recording medium.

According to a first aspect of the present invention, there is provided a data recording apparatus having a recording means for recording a data file as one or a plurality of blocks on a randomly accessible recording medium; a managing means for managing the recording position of the data file by using management data comprised of the file name of the data file, data indicating the head positions of the blocks, data indicating the sizes of the blocks, and data indicating the links among the blocks; a detecting means for detecting the degree of division of the data file based on the quantitative number of the blocks indicated by the management data; and a moving means for moving the blocks so that the data is recorded at a position where blocks of continuous contents of data are recorded continuously as much as possible in accordance with the degree of the division of the data file in response to a result of detection of the detecting means.

In the present invention, the data recording apparatus further has an empty area managing means for managing the positions of the empty areas on the recording medium by using empty area management data comprised of data indicating the head positions of the empty areas, data indicating the sizes of the empty areas, and data indicating the links among the empty areas; a second detecting means for detecting the degree of dispersion of the empty areas based on the quantitative number of the empty areas indicated by the empty area management data and the quantitative number of the blocks indicated by the management data; and a second moving means for moving the blocks so that the data is recorded at positions where the blocks are in adjacent to each other in accordance with the degree of dispersion of the empty areas in response to the result of detection of the second detecting means.

According to a second aspect of the present invention, there is provided a method of data management, including a step of managing the recording position of a data file by using management data comprised of the file name of the data file, the data indicating the head positions of the blocks, the data indicating the sizes of the blocks, and the data indicating the link among the blocks; a step of detecting the degree of division of the data file based on the quantitative number of the blocks indicated by the management data; a step of moving the blocks so that the data is recorded at positions where blocks of continuous contents of data are continuous as much as possible in accordance with the degree of the division of the data file in response to the result of detection; and a step of updating the management data in accordance with the positions of the blocks after the movement.

In the present invention, the method of data management further has a step of managing the positions of the empty areas on the recording medium by using empty area management data comprised of data indicating the head positions of the empty area, data indicating the sizes of the empty areas, and data indicating the links among the empty areas; a step of detecting the degree of dispersion of the empty areas based on the quantitative number of the empty areas indicated by the empty area management data and the quantitative number of the blocks indicated by the management data; and a step of moving the blocks so that the data is recorded at positions where the blocks are adjacent to each other in accordance with the degree of dispersion of the empty areas in response to this result of detection.

BRIEF DESCRIPTION OF THE DRAWINGS

The above objects and features of the present invention will be more apparent from the following description of the related art and preferred embodiments made with reference to the accompanying drawings, wherein:

FIG. 2 is a view of the configuration of a data recording apparatus according to the embodiment of the present invention;

FIG. 6A to FIG. 6D are views for explaining the operation of the data recording apparatus shown in FIG. 2;

FIG. 7A is a view of a state where the quantitative number of the empty areas is the smallest;

FIG. 7B is a view of the state where the quantitative number of the empty areas is the largest;

DESCRIPTION OF THE PREFERRED EMBODIMENTS

Before describing the preferred embodiments of the present invention, the related art and the disadvantages therein will be described with reference to the accompanying figures.

As stated earlier, when recording data on a disc medium such as a hard disc or magneto-optic disc (MO disk), the file management, that is, the way the files are recorded on the disc, for example, the method of assignment of files to the recording regions, is important. One example of this file management will be explained referring to FIG. 1A and FIG. 1B.

Figures 1A, 1B:
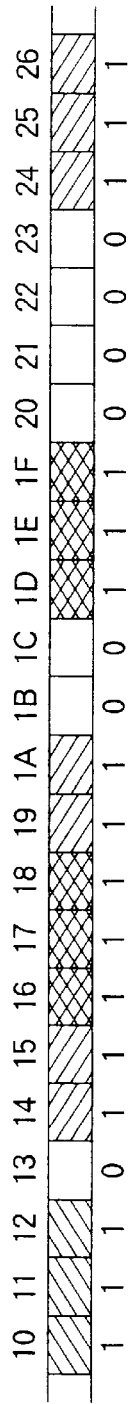
FIG. 1A and FIG. 1B are views for explaining one example of a method of file management.

FIG. 1A is a table of the correspondence of file names and sector numbers in use, while FIG. 1B is a view schematically showing the state of recording on a recording medium.

In this management method, as shown in FIG. 1A, the files are managed by a table showing the correspondence between file names and the identification numbers of the sectors of the recording medium on which those files are recorded. When example reproducing a file, first that table is searched referring to the file name to obtain the identification numbers of the sectors at which that file is recorded. Then, the sectors are accessed in the order of the obtained identification numbers of the sectors to access the substance of the data file.

In the example of FIG. 1A, a file A is comprised of three sectors 10, 11, and 12. Further, a file B is comprised of four sectors of two continuous sectors 14 and 15 and two continuous sectors 19 and 1A. Further, a file C is comprised of three continuous sectors 16, 17, and 18 and three continuous sectors 1D, 1E, and 1F.

The empty areas of this recording medium are managed by a sector bit map. The sector bit map is a bit map comprised of bits corresponding to used sectors defined as 1 and bits corresponding to not used sectors defined as 0. In the example of FIG. 1B, the bit map from the sector 10 to the sector 1F can be represented by 1110111111100111= (EFE7)h, where h represents a hexadecimal expression. When newly recording a file, empty areas are searched for using this bit map.

Where data which is relatively large and has continuity such as AV data (data including audio data and video data) is recorded on a recording medium managed by such a method, to raise the effective transfer rate by decreasing the number of seek and search operations, it is necessary that the recording be carried out so that the data becomes as much as possible single string, that is, the data be recorded in continuous sectors and there be little discontinuous portions of the sectors.

For this purpose, first, it is necessary to sufficiently grasp to what degree each file recorded on the recording medium is divided for recording (hereinafter this will be sometimes also referred to as fragmentation of the data) and to what degree the empty areas are dispersed (hereinafter this will be sometimes also referred to as fragmentation of the empty areas).

Further, in addition, it is necessary to reduce the fragmentation of the data and the fragmentation of the empty areas as much as possible by suitably moving the fragmented data.

As explained earlier, however, in this method of file management, there exists a problem that it is difficult to firmly grasp the state of fragmentation of the data and fragmentation of the empty areas.

That is, when trying to grasp the fragmentation of the data in the method of file management, it is necessary to trace back the identification numbers of all sectors used by the files recorded on the table. Further, when trying to grasp the fragmentation of the empty areas, it is necessary to sequentially check the bit map and count the quantitative number of the empty sectors and, at the same time, detect the state of continuity of them. If carrying out these processings one after another whenever recording a new file, the time for recording the file will increase and the performance as the recording apparatus will be lowered. Accordingly, in the above method of file management, the fragmentation of the data and the fragmentation of the empty areas could not be actually grasped.

Since the state of the fragmentation of the data and the fragmentation of the empty areas cannot be suitably grasped in this way, it was not possible to reduce the fragmentation of the data and appropriately move the data either so that the empty areas become continuous as much as possible.

An embodiment of a data recording apparatus of the present invention will be explained referring to FIG. 2 to FIG. 8.

The present embodiment is a data recording apparatus for recording a relatively large amount of continuous data preferably used in for example an AV server storing a plurality of AV data (audio and/or video data) and appropriately transmitting the same in response to requests.

More specifically, the data recording apparatus of the present invention is a large capacity hard disc device comprising a magnetic disk medium, an interface means thereof, and a signal processing unit.

FIG. 2 is a block diagram of an embodiment of the data recording apparatus of the present invention.

A data recording apparatus 100 has a magnetic disc medium 110, an interface unit 120, and a signal processing unit 130. The signal processing unit 130 has a control unit 131, a recording and reproduction unit 132, a file fragmentation detection unit 133, a first block movement unit 134, an empty area fragmentation detection unit 135, and a second block movement unit 136.

The magnetic disc medium 110 is constituted by a management data storage area 111 and actual data storage areas 112.

First, an explanation will be made of the configuration of the portions of the data recording apparatus 100.

The magnetic disc medium 110 is a hard disc recording medium on which is actually recorded the AV data and management data. The magnetic disc medium 110 is divided into a plurality of partitions. One of them is used as the management data storage area 111, and the remainder are used as the real data storage areas 112. Each storage region is divided into sectors of predetermined bytes (256 bytes in the present embodiment). The data is recorded in units of these sectors.

Here, the explanation will be made of the management data and the method of data management referring to FIG. 3A to FIG. 3C and FIG. 4A to FIG. 4B.

Figure 3A:
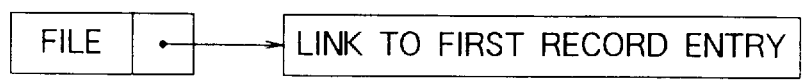
FIG. 3A is a view for explaining a file entry of the management data used in the data recording apparatus shown in FIG. 2.
Figure 3B:
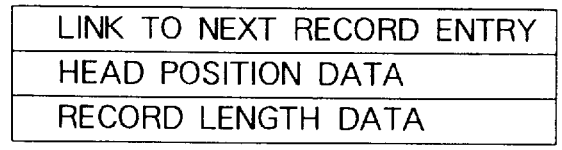
FIG. 3B is a view for explaining a record entry of the management data used in the data recording apparatus shown in FIG. 2.
Figure 3C:
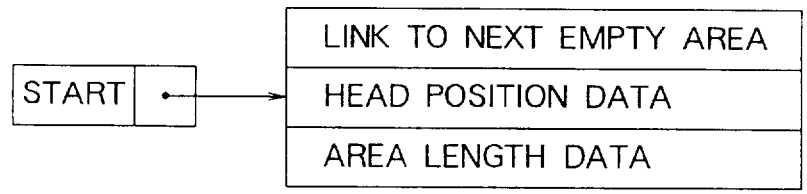
FIG. 3C is a view for explaining empty area management data used in the data recording apparatus shown in FIG. 2.

FIG. 3A to FIG. 3C are views explaining the management data of the recording data, in which FIG. 3A is a view explaining a file entry, FIG. 3B is a view explaining a record entry; and FIG. 3C is a view explaining an empty area list.

There is a file entry for each data file in which the file name of that data file and the link data to the first record entry are recorded. The link data is the identification number of the record entry.

In the record entry, link data indicating the link relationship to the next record entry, head position data indicating the head position of the block region in which the data is actually recorded, and recording length data indicating the size of the block region are recorded. There is a record entry for every block when the data is recorded with the file divided into a plurality of blocks. The link data is the identification number of the next record entry. In the record entry corresponding to the final block, an EOR (end-of-record) code is recorded. Further, as the head position data and the recording length data, the identification numbers of the sectors of the actual storage regions and the quantitative number of the sectors are recorded.

As the empty area list, one item is provided for each of the continuous empty areas on the recording medium. In each item, link data indicating the link relationship of the next empty area, head position data indicating the head position of that empty area, and recording length data indicating the size of the empty area are recorded. The link data is a code indicating if there is another empty area next or if it is the final empty area. Further, the head position data and the recording length data are the identification number of the sectors of the real storage regions and the quantitative number of the sectors.

A more concrete explanation will be made of such management data referring to FIG. 4A to FIG. 4D.

Figure 4A:
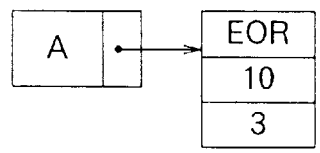
FIG. 4A is a view for explaining the management data of a file A used in the data recording apparatus shown in FIG. 2.
Figure 4B:
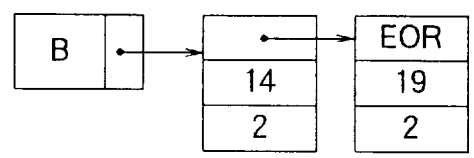
FIG. 4B is a view for explaining the management data of a file B used in the data recording apparatus shown in FIG. 2.
Figure 4C:
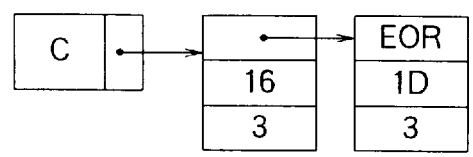
FIG. 4C is a view for explaining the management data of a file C used in the data recording apparatus shown in FIG. 2.
Figure 4D:
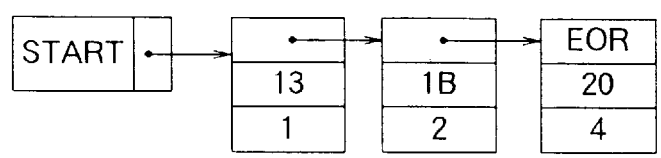
FIG. 4D is a view for explaining an empty area management data for the empty areas used in the data recording apparatus shown in FIG. 2.

FIG. 4A to FIG. 4D are views of management data for the recording data shown in FIG. 1B, in which FIG. 4A is a view of a file entry and record entry of a file A; FIG. 4B is a view of a file entry and record entry of a file B; FIG. 4C is a view of a file entry and record entry of a file C; and FIG. 4D is a view of an empty area list.

As shown in FIG. 4A, the file A is managed by one record entry since the sectors 10, 11, and 12 are continuous. Since the sectors 14 and 15 are continuous and the sectors 19 and 1A are continuous, the file B is managed by two record entries as shown in FIG. 4B. Further, since the sectors 15, 16, and 17 are continuous and the sectors 1D, 1E, and 1F are continuous, the file C is managed by two record entries as shown in FIG. 4C. Further, as the empty area, since the sector 13 constitutes one block, the sectors 1B and 1C constitute one block, and the sectors 20, 21, 22, and 23 constitute one block, in the empty area list, these blocks are described by the starting sector and size. The list becomes as shown in FIG. 4D with the links arranged in order of address.

The interface unit 120 actually drives and controls the magnetic disc medium 110 to perform the writing and reading of the data. Concretely, it performs the rotation of the magnetic disc, seek operation of the head, search operation of a sector, etc. to perform the recording and reproduction of data with respect to a desired storage region.

The control unit 131 of the signal processing unit 130 controls the portions constituting the data recording apparatus 100 for making the entire data recording apparatus 100 perform a desired operation.

The control unit 131 receives as input a signal instructing a write, read, or erase operation of data from a higher apparatus connected to the data recording apparatus 100 and instructs processing to the recording and reproduction unit 132 based on this signal.

Further, the control unit 131 outputs a management signal to the file fragmentation detection unit 133 and empty area fragmentation detection unit 135 so as to manage the state of recording data on the magnetic disc medium 110 at a predetermined timing.

The recording and reproduction unit 132 actually controls the flow of the data recorded on the magnetic disc medium 110 and the data read from the magnetic disc medium 110 and further performs processing to erase data.

At the time of recording data, under a control signal from the control unit 131, first, the management data recorded in the management data storage area 111 of the magnetic disc medium 110 is read via the interface unit 120. Next, based on that management data, the sectors for recording the data in the data storage areas 112 of the magnetic disc medium 110 are determined and the recording of the data to those sectors is actually carried out via the interface unit 120. Then, the interface unit 120 adds information concerning the newly recorded data to the management data to update the data and records the same in the management data storage area 111.

Even at the time of reproducing data, similar to the time of recording data, based on a control signal from the control unit 131, the management data is first read. Then, based on the management data, the data recorded in the sectors of the data storage areas 112 of the magnetic disc medium 110 is read and output to the outside at a predetermined timing. At the time of reading data, basically it is not necessary to update the management data.

When erasing the data, based on the control signal from the control unit 131, the interface unit 120 reads the above management data, erases the data concerning the data file to be erased in the management data, and records that management data in the magnetic disc medium 110 again.

The file fragmentation detection unit 133 detects the state of fragmentation of the data file recorded on the magnetic disc medium 110 and decides whether or not that state is within a suitable range. When that state is not within a suitable range, movement of a data block is instructed to the first block movement unit 134 until a suitable state is exhibited.

Here, an explanation will be made of the method of detecting the fragmentation of a data file.

The file A indicating the management data in FIG. 4A is represented by one record entry. Accordingly, no fragmentation of the data occurs. However, the file B and the file C are respectively represented by two record entries. Accordingly, fragmentation of the data occurs. Namely, by using an index D of the ratio of the quantitative number F of the file entries and the quantitative number R of the record entries, the ratio of fragmentation of the entire data can be found as follows:

$$D=F/R \qquad (1)$$

where, F is the quantitative number of file entries and
R is the quantitative number of record entries.

This index D becomes "1" where no fragmentation occurs and approaches "0" where a large degree of fragmentation occurs. For example, a value of this index of "0.5" indicates that the data is recorded while dividing one file into two blocks in average.

Therefore, based on the control signal from the control unit 131, the file fragmentation detection unit 133 first reads the management data of the magnetic disc medium 110 via the interface unit 120. Then, an index D indicating the state of dispersion of the data file is calculated based on Equation 1 by using the quantitative number F of file entries and the quantitative number R of record entries in the read and fetched management data.

Further, that index D is compared with a preliminarily determined threshold value $D_{TRL}$. Where $D<D_{THL}$, it is decided that the state of fragmentation of the data file is not suitable. Note that, in the present embodiment, the threshold value $D_{THL}=0.25$. Accordingly, when one data file is divided into four or less records on the average, it is decided that the state of fragmentation of the data file is suitable. Where larger than four, it is decided that the state of fragmentation of the data file is not suitable.

As the result of the decision is that the state of fragmentation is not suitable, a signal instructing movement of a data block so as to make the state of fragmentation suitable is output to the first block movement unit 134. At this time, the management data read and fetched from the magnetic disc medium 110 by the file fragmentation detection unit 133 is output to the first block movement unit 134.

After movement of a data block is carried out in the first block movement unit 134 by the operation mentioned later, the file fragmentation detection unit 133 detects the state of fragmentation of the file again and decides whether or not it is suitable. When it is not suitable, it outputs a signal instructing movement of a data block to the first block movement unit 134 again. This processing is repeated until the state of fragmentation of the file becomes a suitable state.

Where the result of the decision is that the state of fragmentation is suitable, a signal indicating this is output to the control unit 131 and the processing is ended.

The first block movement unit 134 moves one of the blocks of the file to a position continuous with a block of data continuous with that block in the case of a data file which recorded on the magnetic disc medium 110 divided into a plurality of blocks so as to reduce the number of fragments. The above processing of the first block movement unit 134 is carried out where it is decided at the file fragmentation detection unit 133 that the state of fragmentation of the data recorded on the magnetic disc medium 110 is not suitable based on the control signal from the file fragmentation detection unit 133 and by utilizing the management data of the magnetic disc medium 110 input from the file fragmentation detection unit 133.

An explanation will be made next of the processing for the movement of a data block in the first block movement unit 134 by referring to FIG. 5.

Figure 5:
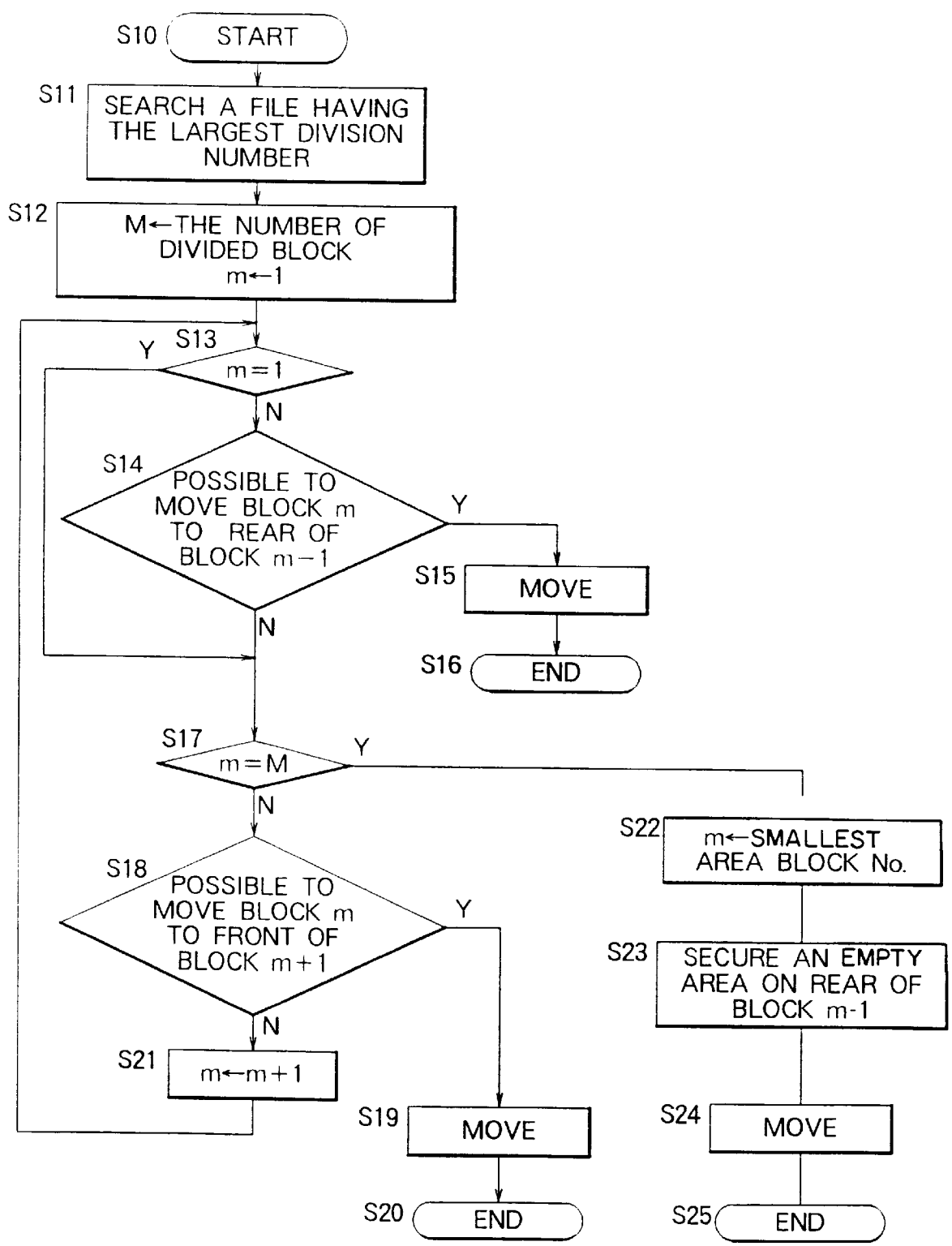
FIG. 5 is a flow chart for explaining the operation of a first block movement unit of the data recording apparatus shown in FIG. 2.

FIG. 5 is a flow chart explaining that movement processing.

First, when a signal instructing the movement of a block is input (step S10), the management data is searched to retrieve the file having the largest division number among the data files recorded on the magnetic disc medium 110 (step S11) and the initial setting of the parameters is carried out (step S12). Here, the operation of the movement processing will be explained by taking as an example a case where the file A and the file D are recorded on the recording medium. In the case of this example, the file having the largest division number is the file D in which the data is divided into the block $D_1$ to the block $D_3$.

Then, for the file D, it is sequentially checked from the head block whether or not the block can be moved before or after the preceding or succeeding block, that is, whether or not there is enough of an empty area to move that block before or after the preceding or succeeding block. Specifically, for each block, first, it is checked whether or not the block can be moved after the preceding block (step S14). As shown in FIG. 6B, where the space of the empty area 1 is larger than the block $D_2$ and movement is possible, as shown in FIG. 6C, it is actually moved (step S15) and the processing for this movement is ended for the time being (step S16). By this movement, the data inside the block $D_1$ and the data inside the block $D_2$ which are continuous data like a video signal will be recorded on the recording medium adjacent to each other as shown in FIG. 6C.

At step S14, where this block cannot be moved to the back of the previous block, that is, as shown in FIG. 6A, where the space of the empty area 1 is smaller than the block $D_2$, it is checked whether or not it can be moved to the front of the block after this (step S18). Where it can be moved, as shown in FIG. 6D, the block $D_2$ is actually moved to the front of the block $D_3$ as shown in FIG. 6D (step S19) and the processing for movement is ended for the time being (step S20). By this movement, the data inside the block $D_2$ and the data inside the block $D_3$, which are continuous data, will be recorded on the recording medium adjacent to each other as shown in FIG. 6D.

At step S18, where the block cannot be moved even to the front of the block after this, the possibility of movement of the block is checked again for the next block (step S21).

Note that, the processing of step S14 for checking the possibility of movement to the previous block (step S13) is not carried out with respect to the head block. Further, the processing of step S18 for checking the possibility of movement to the rear block (step S17) is not carried out with respect to the final block.

Where movement of a block cannot be carried out even if after checking up to the final block (step S17), the smallest block among the blocks other than the head block is retrieved among the blocks constituting this data file (step S22) and processing for moving this block to the rear of the preceding block is carried out. Namely, the data before this is sequentially moved to the rear of the preceding block so as to secure an empty area corresponding to the size of the above block to be moved (step S23). Then, that block is moved to the secured empty area (step S24), and the series of movement processing is ended (step S25). The first block movement unit 134 updates the management data in accordance with this movement at the movement processing and supplies the updated management data to the interface unit 120. The interface unit 120 moves the data to the position indicated by the updated management data and, at the same time, stores the updated management data in the management data storage area 111 of the magnetic disc medium.

Note that, when the processing for movement of a block is ended, the first block movement unit 134 outputs a signal indicating this to the file fragmentation detection unit 133.

When performing such processing, as shown in for example FIG. 6A, the block $D_1$, and the block $D_2$ of the file B separated sandwiching the block A1, a block of the file A, and an empty area 2 therebetween as shown in FIG. 6A, can be unified as shown in FIG. 6C. As a result, the number of fragments of the data file can be reduced by one.

The empty area fragmentation detection unit 135 detects the state of dispersion of the empty areas in the data storage areas 112 of the magnetic disc medium 110 and decides whether or not that state is within a suitable range. Where that state is not within the suitable range, it instructs the movement of a data block to the second block movement unit 136 until a suitable state is exhibited.

Here, an explanation will be made of the method of detecting the state of dispersion of the empty areas referring to FIG. 7A and FIG. 7B.

In the state of recording data shown in FIG. 1B, there are three blocks of empty areas. As shown in FIG. 4D, also the number of items of the empty area list is three. In this way, the quantitative number of blocks of the empty areas and the quantitative number of items of the empty area list coincide.

Further, where a plurality of records exist on the recording medium, a case where the number of the empty areas is the smallest and a case where the number of the empty areas is the largest are exemplified in FIG. 7A and FIG. 7B.

FIG. 7A and FIG. 7B are views of the state where three records in total of the block $A_1$ of the file A and blocks $B_1$ and $B_2$ of the file B are recorded on the recording medium. In such a case, FIG. 7A shows a state where there is one empty area, which is the smallest fragmentation, that is, a state where fragmentation does not occur. Further, FIG. 7B shows a case where there are four empty areas. In this case, the fragmentation is the largest. In this way, where the quantitative number of the records is "R", the quantitative number of blocks of the empty areas is 1 at the minimum and "R+1" at the maximum.

Due to this, if an index F which is the ratio of the quantitative number of the empty areas and the quantitative number of the record entries as shown in Equation 2 is used, the ratio of fragmentation of all empty areas can be found as follows:

$$E=L/(R+1) \quad (2)$$

where,

L is the quantitative number of the empty areas and

R is the quantitative number of the record entries.

This index E becomes "1/(R+1)" where no fragmentation of empty areas occurs and becomes "1" where the fragmentation is the largest.

Accordingly, concretely, the empty area fragmentation detection unit 135 reads and fetches the management data of the magnetic disc medium 110 via the interface unit 120 based on a control signal from the control unit 131. Then, the index E indicating the state of dispersion of the data files is calculated based on Equation 2 by using the quantitative number L of the empty areas and the quantitative number R of the record entries referring to the empty area list in the read and fetched management data.

Further, this index E is compared with the preliminarily determined threshold value $E_{THL}$. Where $E>E_{THL}$, it is decided that the state of fragmentation of the data file is not suitable. Note that, in the present embodiment, the threshold value $E_{THL}=0.5$. Accordingly, in a state where about a half or more data of all data files are independently recorded in the empty areas, that is, in a state where the data is not recorded adjacent to other data with a good efficiency, it is decided that the state of dispersion of the empty areas is not suitable.

Where the result of the decision is that the state of fragmentation is not suitable, a signal instructing movement of a data block so as to make the state of fragmentation suitable is output to the second block movement unit 136. At this time, also the management data read and fetched from the magnetic disc medium 110 by the empty area fragmentation detection unit 135 is output to the second block movement unit 136.

After the movement of the data block is carried out in the second block movement unit 136 by the operation mentioned later, the empty area fragmentation detection unit 135 detects the state of fragmentation of the empty areas again and decides whether or not it is suitable. Then, where it is not suitable, a signal instructing the movement of a data block is output to the second block movement unit 136 again. This processing is repeated until the state of fragmentation of the empty areas becomes suitable.

When the result of the decision is that the state of dispersion of the empty areas becomes suitable, a signal indicating this is output to the control unit 131 and the processing is ended.

The second block movement unit 136 appropriately moves a series of records recorded in the data storage areas 112 of the magnetic disc medium 110, assembles the empty areas dispersed to a plurality of positions into one group as much as possible, and thereby enable a large continuous empty area to be secured. This processing of the second block movement unit 136 is carried out where it is decided that the state of dispersion of the empty areas is not suitable in the empty area fragmentation detection unit 135, based on the control signal from the empty area fragmentation detection unit 135, and by utilizing the management data of the magnetic disc medium 110 input from the empty area fragmentation detection unit 135.

An explanation will be made next of the processing for the movement of a data block in the second block movement unit 136 referring to FIG. 8.

Figure 8:
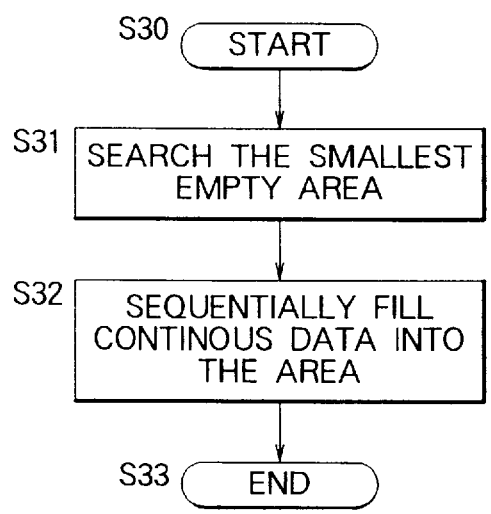
FIG. 8 is a flow chart for explaining the operation of the second block movement unit of the data recording apparatus shown in FIG. 2.

FIG. 8 is a flow chart explaining the processing for movement.

First, when a signal instructing the movement of a block is input (step S30), the empty area list is searched to retrieve the smallest region among the empty areas existing in the portions of the magnetic disc medium 110. Then, the series of data adjacent to the empty area are sequentially moved so as to fill the empty area (step S32). When this movement is ended, the processing is ended (step S33). By this, empty areas existing sandwiching the data are unified to one empty area.

when the processing of the movement of this series of data blocks is ended, a signal indicating this is output to the empty area fragmentation detection unit 135. The second block movement unit 134 updates the management data in accordance with this movement at the this movement processing and supplies the updated management data to the interface unit 120. The interface unit 120 moves the data to the position indicated by the updated management data and, at the same time, stores the updated management data in the management data storage area 111 of the magnetic disc medium.

Figure 9A:
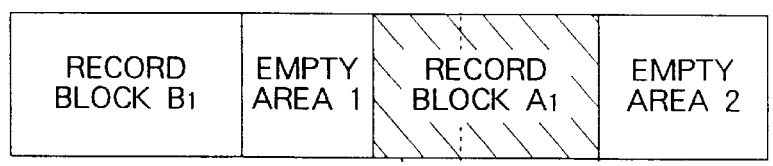
FIG. 9A to FIG. 9C are views for explaining the operation of the second block movement unit of the data recording apparatus shown in FIG. 2.
Figure 9B:
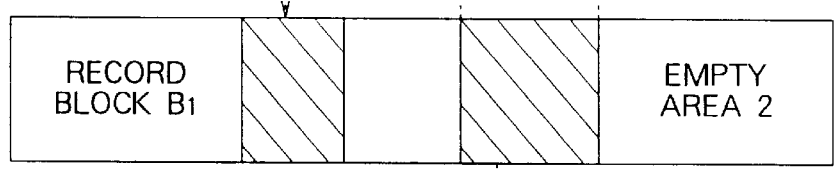
Figure 9C:
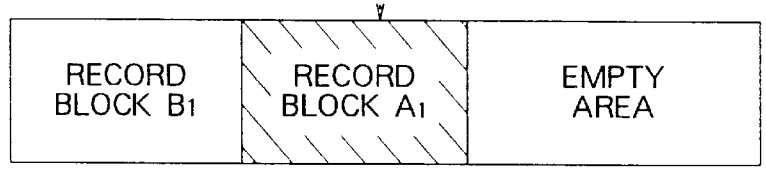

When performing such processing, as shown in for example FIG. 9A, in a small empty area, as shown in FIG. 9B, the adjacent records are sequentially moved, and finally combined to the adjacent empty area 2 as shown in FIG. 9C. Accordingly, it is possible to assemble finely dispersed empty areas to obtain empty areas which are continuous and large as much as possible.

Next, an explanation will be made of the operation of the data recording apparatus 100.

In the data recording apparatus 100, a control signal instructing a write, read, or erase operation of the data is input to the control unit 131 from a connected higher apparatus. Due to this, the recording and reproduction unit 132 perform the input or output of data to or from the outside or the recording of data to the magnetic disc medium 110 via the interface unit 120. When recording and erasing the data to the magnetic disc medium 110 via the interface unit 120, the management data recorded in the management data storage area 111 of the magnetic disc medium 110 is also updated by the interface unit 120.

Then, the control unit 131 checks the state of recording of the data of the magnetic disc medium 110 via the file fragmentation detection unit 133 and the empty area fragmentation detection unit 135 at every predetermined time. Namely, first, the state of the fragmentation of the data files recorded on the magnetic disc medium 110 is checked. If it is not suitable, the control unit 131 instructs the file fragmentation detection unit 133 to enhance it. When the check of the state of fragmentation of the data files is ended, a check of the state of dispersion of the empty areas is carried out. If it is not suitable, the control unit 131 instructs the empty area fragmentation detection unit 135 to enhance it. When the check and enhancement of both of the fragmentation of data and the fragmentation of the empty areas are ended, it performs the usual input and output processing of the data again.

In the file fragmentation detection unit 133, first, the management data of the magnetic disc medium 110 is read, the index D indicating the fragmentation of the file is calculated based on Equation 1, the index D is compared with the preliminarily determined threshold value $D_{THL}$, and it is decided whether or not the state of fragmentation of the file is suitable. When it is not suitable, the movement of a data block is instructed to the first block movement unit 134 until it becomes suitable.

Further, in the empty area fragmentation detection unit 135, first, the management data of the magnetic disc medium 110 is read, the index E indicating the fragmentation of the empty areas is calculated based on Equation 2, the index E is compared with the preliminarily determined threshold value $E_{THL}$, and it is decided whether or not the state of fragmentation of the empty areas is suitable. When it is not suitable, the movement of a data block is instructed to the second block movement unit 136 until it becomes suitable.

In this way, according to the data recording apparatus 100 of the present embodiment, the state of the fragmentation of the data and the state of the dispersion of the empty areas can be suitably managed, and it is possible to prevent taking a long time for access since the data is remarkably separated due to the empty areas being very finely separated and thereby prevent a large continuous file from not being able to be recorded, and the recording of the data can be suitably and efficiently carried out.

Note that, the method of data management and data recording apparatus of the present invention are not limited to the present embodiments. Various modifications are possible.

For example, also the configuration of the data recording apparatus 100 shown in FIG. 2 is not limited to this and can be freely modified. For example, it is also possible to appropriately combine for example the control unit 131, the file fragmentation detection unit 133, the first block movement unit 134, the empty area fragmentation detection unit 135, the second block movement unit 136, etc., or it is also possible to control all elements by one control means.

Further, the processing procedure of the movement of the data blocks in the first block movement unit 134 and the second block movement unit 136 is not limited to the processing the flow chart shown in FIG. 5 and FIG. 8. Data blocks can be moved by any rule.

Further, while the recording medium of the data recording apparatus of the present embodiment was a hard disc, the recording medium is not limited to this. Any recording medium can be adopted so far as it is a randomly accessible recording medium. For example, it may be a magneto-optic disc device, a rewritable optical disc device, etc. too.

Further, for the fragmentation of the data and the fragmentation of the empty area, the threshold value for deciding whether or not the fragmentations are suitable can be freely determined in accordance with the purpose of the hard disc device and nature of the data to be recorded etc.

In this way, the state of fragmentation of a data file of the recording medium can be grasped by just performing a simple operation based on the number of the file entries and the record entries used for the file management. Further, the state of dispersion of the empty areas of the recording medium can be grasped by using the empty area list. Accordingly, in a case where the state of recording on the recording medium is not suitable, for example, where the data file is separated into a very large number of blocks and where there is no assembled empty area etc., the fragmentation of the data and empty areas can be reconstructed by appropriately moving the blocks.

As a result, a data recording apparatus which can suitably and efficiently record AV data having a large volume, which is continuous data, can be provided.

What is claimed is:

1. A data recording apparatus comprising:
    a recording means for recording a data file as one or a plurality of blocks on a randomly accessible recording medium;
    a managing means for managing the recording position of the data file by using management data comprised of the file name of the data file, data indicating the head positions of the blocks, data indicating the sizes of the blocks, and data indicating the links among the blocks;
    a detecting means for detecting the degree of data file division based on the quantitative number of the blocks indicated by the management data; and
    a moving means for moving the blocks so that the data is recorded on the randomly accessible recording medium at a position where blocks of continuous contents of data are recorded continuously in accordance with the detected degree of data file division.

2. A data recording apparatus as set forth in claim 1, wherein the managing means updates said management data in accordance with positions of the blocks after movement by said moving means.

3. A data recording apparatus comprising:
    a recording means for recording a data file as one or a plurality of blocks on a randomly accessible recording medium;
    a managing means for managing the recording position of the data file by using management data comprised of the file name of the data file, data indicating the head positions of the blocks, data indicating the sizes of the blocks, and data indicating the links among the blocks;

a first detecting means for detecting the degree of data file division based on the quantitative number of the blocks indicated by the management data;

a first moving means for moving the blocks so that the data is recorded at a position where blocks of continuous contents of data are recorded continuously in accordance with the detected degree of data file division;

an empty area managing means for managing the positions of the empty areas on the recording medium by using empty area management data comprised of data indicating the head positions of the empty areas, data indicating the sizes of the empty areas, and data indicating the links among the empty areas;

a second detecting means for detecting the degree of dispersion of the empty areas based on a quantitative number of the empty areas indicated by the empty area management data and the quantitative number of the blocks indicated by the management data; and a second moving means for moving the blocks so that the data is recorded at positions where the blocks are adjacent to each other in accordance with the degree of the dispersion of the empty areas in response to the result of detection of the second detecting means.

4. A data recording apparatus as set forth in claim 3, wherein the empty area managing means updates said empty area management data in accordance with positions of the blocks after movement by said moving means.

5. A data recording apparatus as set forth in claim 3, wherein said second detecting means detects a degree E of dispersion of said empty areas by the following equation:

$$E=L/(R+1)$$

where,

L is the quantitative number of said empty areas, and

R is the quantitative number of said blocks.

6. A data recording apparatus as set forth in claim 5, wherein said second moving means moves said block when the relationship between the degree E of dispersion of said empty areas and the threshold value $E_{THL}$ of the predetermined value is defined as $E<E_{THL}$.

7. A data recording apparatus as set forth in claim 1 wherein said detecting means detects the degree of data file division based on a relationship between the number of data files and the number of blocks in all of said data files.

8. A data recording apparatus comprising:

a recording means for recording a data file as one or a plurality of blocks on a randomly accessible recording medium;

a managing means for managing the recording position of the data file by using management data comprised of the file name of the data file, data indicating the head positions of the blocks, data indicating the sizes of the blocks, and data indicating the links among the blocks;

a detecting means for detecting the degree of data file division based on the quantitative number of the blocks indicated by the management data; and a moving means for moving the blocks so that the data is recorded at a position where blocks of continuous contents of data are recorded continuously in accordance with the detected degree of data file division;

wherein said detecting means detects a degree D of data file division by the following equation:

$$D=F/R$$

where,

F is the quantitative number of said data files, and

R is the quantitative number of said blocks.

9. A data recording apparatus as set forth in claim 8, wherein said moving means moves said block when the relationship between the degree D of said data file and the threshold value $D_{THL}$ of the predetermined value is defined as $D<D_{THL}$.

10. A method of data management, including the steps of:

managing the recording position of a data file on a randomly accessible recording medium by using management data comprised of the file name of the data file, data indicating the head positions of data blocks, data indicating the sizes of the data blocks, and data indicating the link among the data blocks;

detecting the degree of data file division based on the quantitative number of data blocks indicated by the management data;

moving the data blocks so that the data is recorded on the randomly accessible recording medium at positions where blocks of continuous contents of data are continuous in accordance with the degree the detected data file division; and updating the management data in accordance with the positions of the data blocks after the movement.

11. A method of data management including the steps of:

managing the recording position of a data file by using management data comprised of the file name of the data file, data indicating the head positions of data blocks, data indicating the sizes of the data blocks, and data indicating the links among the data blocks;

detecting the degree of data file division based on the quantitative number of data blocks indicated by the management data;

moving the data blocks so that the data is recorded at positions where blocks of continuous contents of data are continuous in accordance with the degree of the detected data file division;

updating the management data in accordance with the positions of the data blocks after the movement;

managing the positions of empty areas on the recording medium by using empty area management data comprised of data indicating the head positions of the empty area, data indicating the sizes of the empty areas, and data indicating the links among the empty areas;

detecting the degree of dispersion of the empty areas based on the quantitative number of the empty areas indicated by the empty area management data and the quantitative number of the data blocks indicated by the management data; and moving the data blocks so that the data is recorded at positions where the data blocks are adjacent to each other in accordance with the detected degree of dispersion of the empty areas.

* * * * *